United States Patent [19]

Harris

[11] Patent Number: 4,468,140

[45] Date of Patent: Aug. 28, 1984

[54] METHOD AND APPARATUS FOR COORDINATED CONTROL OF DOT MATRIX PRINTER HEAD AND CARRIAGE

[75] Inventor: Samuel C. Harris, Waynesboro, Va.

[73] Assignee: Genicom Corporation, Waynesboro, Va.

[21] Appl. No.: 399,130

[22] Filed: Jul. 16, 1982

[51] Int. Cl.³ .............................................. B41J 3/12
[52] U.S. Cl. ................................ 400/124; 101/93.05; 400/121; 400/322
[58] Field of Search ............... 400/121, 124, 320, 322, 400/323; 101/93.04, 93.05

[56] References Cited

U.S. PATENT DOCUMENTS

| | | | |
|---|---|---|---|
| 3,973,662 | 8/1976 | Fulton | 400/124 |
| 4,116,567 | 9/1978 | San Pietro | 400/124 |
| 4,210,404 | 7/1980 | Hanger | 400/124 |
| 4,213,714 | 7/1980 | Jones et al. | 400/124 |
| 4,278,359 | 7/1981 | Weikel | 400/121 |
| 4,284,362 | 8/1981 | Jackson et al. | 400/124 |

Primary Examiner—Paul T. Sewell
Attorney, Agent, or Firm—Cushman, Darby & Cushman

[57] ABSTRACT

A dot matrix printer has a programmable interval counter which produces motion control pulses for stepping the stepper motor of a print head carriage and/or of a paper advance system. The same motion control pulse which is used to control the carriage step motor is also input to a microprocessor, in an open loop fashion, to request further print head data for driving the wire array(s) of the dot matrix print head. A programmed time delay may be introduced between the programmable interval counter and the carriage step motor to compensate for wire flight time of the print head wires in a manner which is substantially independent of carriage velocity. A variable delay may also be introduced between the programmable interval counter and the microprocessor to compensate for carriage motor shaft lag/lead. The number of print operations per control pulse and the number of control pulses per print operation may be independently controlled to increase the print density and quality by inserting programmable divider/counters between the programmable interval counter and the microprocessor and/or the carriage stepper motor.

24 Claims, 7 Drawing Figures

METHOD AND APPARATUS FOR COORDINATED CONTROL OF DOT MATRIX PRINTER HEAD AND CARRIAGE

The present invention is related to dot matrix printers and more particularly to control circuitry for coordinating the motion of the print head carriage with the printing action of the print head of such printers.

This application is related to my copending commonly assigned U.S. patent application Ser. No. 399,129 filed July 16, 1982 and Ser. No. 399,216 filed July 19, 1982. The disclosure of both these related applications is hereby incorporated by reference.

The use of dot matrix printers in various printing applications is well known. Advances in the art which require higher printing speeds and greater density have led to problems in coordinating motion of the carriage with the printing action of the matrix of individually controllable dot print wires in the print head. Additionally, with bi-directional printing in which print element dots are interlaced (e.g. for greater vertical dot density) it is necessary to place dots that are printed from opposite directions in precise registration. At high print speeds, print wire flight time can become an impediment to good registration. Furthermore, the shaft of the carriage drive (or other elements in the mechanical drive train) typically lag the desired position by various degrees during acceleration and similarly lead the desired position during deceleration of the carriage. Such shaft lag/lead errors can also contribute to errors in dot placement on the paper and thus degraded print quality.

The exemplary embodiment of this invention is believed to provide a simplified yet more coordinated scheme. For example by using the output of the carriage motion control circuit to generate further print data request signals (e.g. feed back to the data source), it is possible to considerably simplify the coordination of print head motion and printing action. This novel overall arrangement also facilitates the accurate compensation of both wire flight time delay and motor shaft lag/lead in novel and advantageous ways.

Prior attempts to compensate for print wire flight delay time have generally required that the command to effect a print action lead the command to effect another carriage motion increment by a time corresponding to the distance travelled by the carriage during the flight time of the wire. This approach however is obviously dependent upon the carriage velocity. A different lead setting is therefore necessary for each carriage velocity. Typically, this prior art solution may require a table to store several lead settings and logic to select the proper lead setting for a sensed carriage velocity. Such a system becomes increasingly hard to control as the number of possible values for the velocity increases.

The exemplary embodiment of the present invention provides a dot matrix control circuit which causes the motion of the carriage to lag the action of the print head —rather than trying to lead the print action. Since the wire flight delay time is usually a constant value for a given print head, the circuit used to delay the carriage motion need only respond to one predetermined delay value. Thus, no matter what the velocity of the carriage, the proper lag time is easily introduced to coordinate motion of the print head with carriage movement.

By providing a divider/counter between the carriage motion control circuit and the actual step motor driver, plural dot elements can be printed for each carriage motor step. This increased dot density in the horizontal direction (i.e. in the direction of carriage motion) can be changed as desired for different printing effects, different print heads, etc. by making the divider/counter programmable—e.g. under control of the microprocessor which acts to supply print data and to effect overall system control.

A second delay counter and/or divider counter can also be employed between the carriage motion control circuit and the print head control circuits. Compensation for carriage motor shaft lag/lead can then be provided by this extra delay counter while the extra divider controls the number of carriage motor steps per printed dot. Since the latter control is just the inverse of that provided by the first divider (i.e. dots-per-step as opposed to steps-per-dot), a very flexible vernier control over the final ratio of printed dots per step can be provided. For example, if three motor steps are desired for five dot elements, then the first divider would be programmed to divide by five while the second would be programmed to divide by three.

The present exemplary embodiment provides a microprocessor based dot matrix printer control circuit which coordinates the motion of a print head carriage and the printing action of a dot matrix print head carried by the carriage. A conventional programmable interval counter controls the velocity profile of a step motor by the production of variable frequency motion control pulses. To accelerate, the control pulse frequency is increased—typically to a desired constant value. To decelerate, the pulse frequency is reduced in a controlled way.

The motion control pulses which ultimately cause the step motor to step are also preferably used to generate print data request inputs to the microprocessor. In response to such data request pulses, the microprocessor outputs desired print data to a dot element print data register. The dot element register, in turn, ultimately provides the print data to a conventional wire drive circuit which selectively drives the individual wires of a print head so as to print an array of individual dots corresponding thereto. Unless delay is purposefully added (as in some exemplary embodiments), the actual print command takes place so soon after a data request signal as to be considered instantaneous for typical carriage motion speeds.

In one exemplary embodiment of the present invention a programmable divider/counter is interposed between the programmable interval counter and the step motor drive circuit to reduce the number of motion control pulses input to the stepper motor such that several data request pulses may be input to the microprocessor in response to each step of the stepper motor. This embodiment provides greater print density for more detail and better quality print.

A second exemplary embodiment of the present invention interposes a delay counter between the programmable interval counter and the step motor drive circuitry. The delay counter delays pulses which step the carriage motor so as to provide wire flight time delay compensation which is independent of the carriage speed.

Another exemplary embodiment of the present invention interposes both the programmable divider/counter and the delay/counter between the programmable interval counter and the stepper motor drive circuitry. This results in (a) controlled slowing of the carriage velocity such that print density can be increased and (b)

controlled wire flight time delay compensation which is independent of carriage velocity.

In still another exemplary embodiment of the present invention a programmable divider/counter and a delay/counter are interposed between the programmable interval counter and the stepper motor drive circuitry as in the previous embodiment. However, a second programmable divider/counter and a second delay/counter are also interposed between the programmable interval counter and the microprocessor (a) to controllably reduce the frequency of data request pulses and (b) to controllably delay the input of the data request pulses to the microprocessor. Since the second delay counter is preferably clocked by the motion control pulses (which are at the instantaneous velocity frequency for the print control sub-system) rather than by the real time system clock, the delay introduced by the second delay counter can be programmed to automatically correctly compensate for motor shaft lag/lead at all speeds. The second programmable divider/counter provides even greater flexibility in choosing multiple dots per carriage motor step which are not mere integer mutliples. For example, the final number of printed dots per motor step can be controlled as any desired ratio of integers.

These as well as other objects and advantages of this invention will be better appreciated and understood by reference to the following detailed description of the presently preferred exemplary embodiments taken in conjunction with the accompanying drawings of which:

Figure 1:
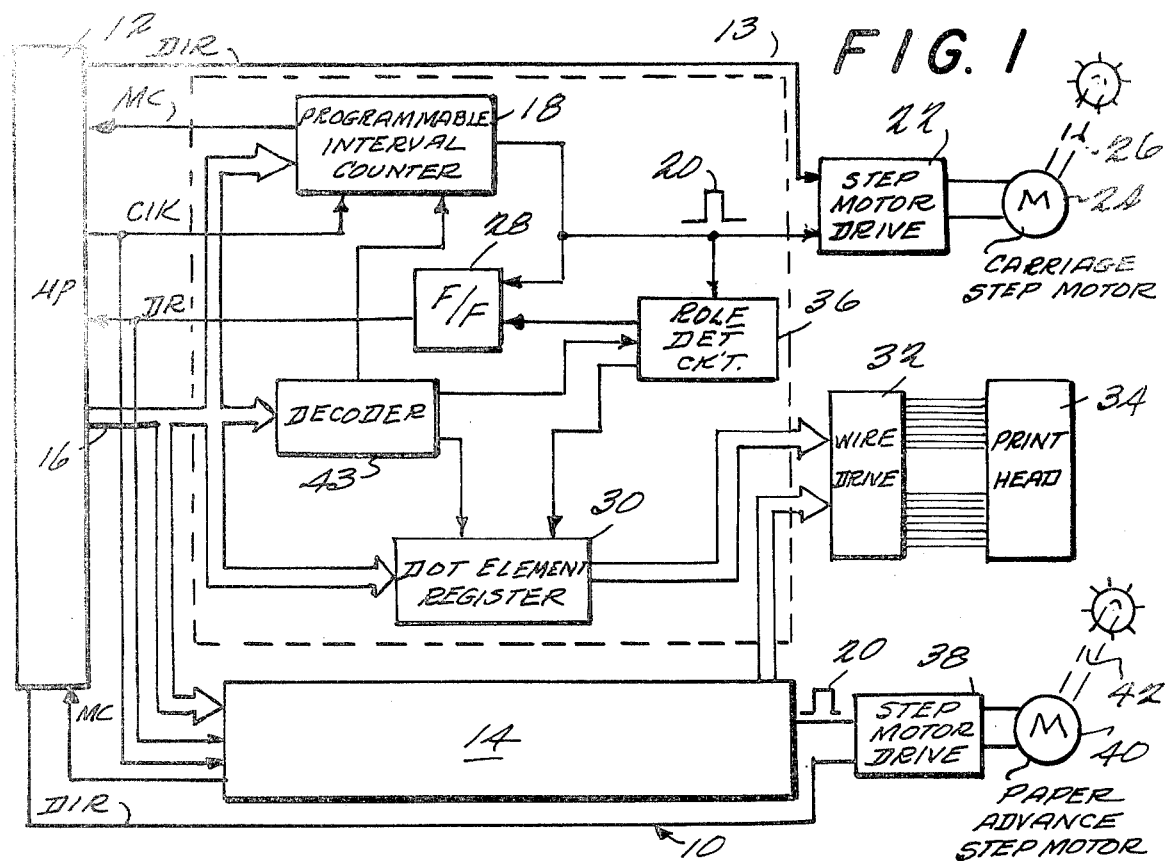
FIG. 1 is a block diagram illustrating an overall control system for a dot matrix printer in accordance with this invention.

FIG. 1 illustrates an overall block diagram of a dot matrix printer control system 10 which includes a microprocessor 12 and two identical controlled sub-systems 13 and 14 which may, if desired, be large scale integration (LSI) chips. Certain of the details within the chip 13 have been illustrated; the reader should be aware that identical components are also found in chip 14. The microprocessor 12, first chip 13 and second chip 14 are conventionally interconnected by a data bus 16.

Within each chip 13, 14 is a programmable interval counter 18 which conventionally produces motion control pulses 20 at varying frequencies designed to produce a desired velocity profile for the controlled step motor. Control pulses 20 are input to a step motor drive circuit 22 which also receives a direction signal DIR from microprocessor 12. The step motor drive circuitry 22 energizes the windings of the stepper motor 24 in response to both the motion control pulses 20 and the direction signal DIR. The stepper motor drive circuitry 22 is described in detail in my above referenced copending U.S. patent application Ser. No. 399,129. When the stepper motor 24 has been commanded to step to the desired position earlier requested by the microprocessor 12, the programmable interval counter 18 typically produces a motion complete signal MC which is fed back to the microprocessor 12.

The motion control pulses 20 are also input to the microprocessor 12 through a flip-flop 28. These motion control pulses enable the flip-flop 28 to produce data request pulses DR for the dot matrix printer 10. This use of the motion control pulses to both control the motion of the stepper motor 24 and to control the request of additional print data from the microprocessor 12 is considered to be an important feature of the present invention. This feature is discussed more fully hereinbelow in conjunction with FIG. 2.

Each chip 13 and 14 contains a dot element data register 30. The register 30 receives print data from the microprocessor 12 via the data bus 16 and delivers it to a conventional wire matrix drive 32 which ultimately selectively drives the individual wires of a dot matrix print head 34. In the exemplary embodiment shown in FIG. 1, the print head 34 has eighteen print wires. To coordinate the operation of the chips 13 and 14 to properly drive the print head 34, a role determining circuit 36 is provided in each chip 13 and 14. The role determining circuit 36 determines a master/slave relationship which controls the input of data into the dot element registers 30 such that each chip 13 and 14, even though identically constructed, responds to different data bytes successively output from the microprocessor 12 in response to a single data request DR. The coordination and operation of the chips 13 and 14 by the role determining circuit 36 is discussed in detail in the aforementioned U.S. patent application Ser. No. 399,216.

In the dot matrix printer 10 illustrated in FIG. 1, since the second chip 14 also contains a programmable interval counter 18, the second chip 14 also produces motion control pulses 20 which are input into a step motor drive circuit 38. The step motor drive circuit 38 may be identical in construction and operation to the aforementioned step motor drive circuit 22. Step motor drive circuit 38 controls step motor 40 which may typically be used to advance paper vertically over a platen or similar structure until the proper position is reached for a new line of print.

A conventional decoder 43 is typically provided to address components of each chip 13, 14 at desired times to enable the addressed component to respond to data on the databus 16 which is intended therefore. A system clock signal CLK is typically input to the various components of each chip to synchronize the transmission and receipt of data, coordinate timed operations, etc. in a well known manner.

Figure 2:
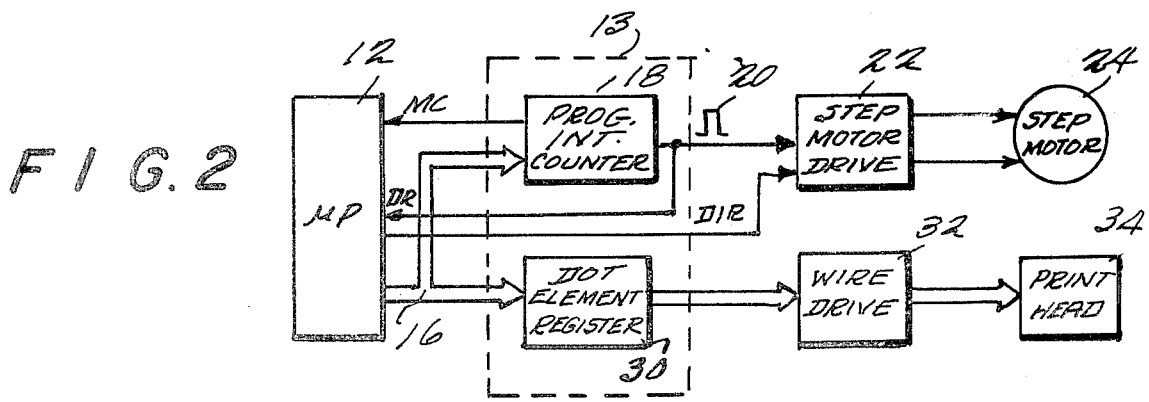
FIG. 2 is a simplified block diagram of a novel portion of the control system of FIG. 1.

FIG. 2 is a simplified block diagram of a unique portion of the control system 10 illustrated in FIG. 1. For the dot matrix printer illustrated in FIG. 1 to operate properly, coordination of print wire actuation with carriage motion is necessary. From FIG. 1, it can been seen that the motion control pulses 20 are also ultimately used to request data from the microprocessor 12. In a practical microprocessor-based system, the response time of the microprocessor 12 to the data request is a neglible part of the step interval and one vertical line of dot element print data will be transferred, as a data byte, substantially instantaneously through the dot element register 30 to the print head drive 32 for each motion increment.

This utilization of the motion control pulses 20 to both step the carriage stepper motor 24 and to request print data for the dot element data register 30 is considered to be an important feature of the present invention. This scheme is, in effect, an open loop control system since the microprocessor 12 does not determine whether the step motor 24 has actually executed the desired motion. Once the motion control pulse 20 is received by the microprocessor 12 as a data request DR, print data is almost immediately output to the dot element data register 30. This data is thereafter used to conventionally drive the wires of a print head 34 to print a desired array of dots on the paper.

Figure 3:
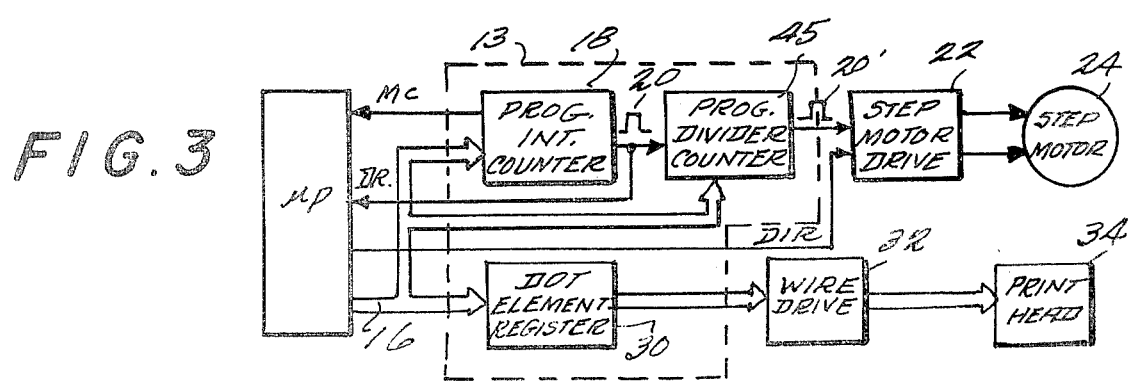
FIG. 3 illustrates another exemplary embodiment of the system of FIG. 2 including the feature of increasing dot print density per carriage motor step.
Figure 4:
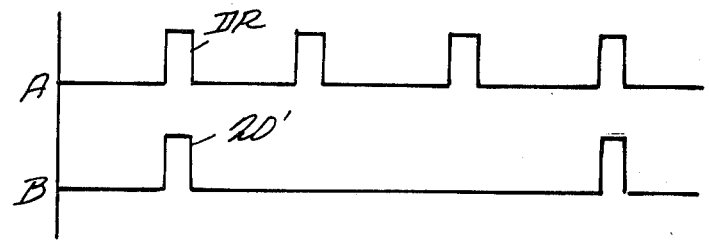
FIG. 4 illustrates signal timing diagrams for the print head control system of FIG. 3.

To provide greater print density for more detail and better quality print it is sometimes desirable to provide more than one printed dot element per stepper motor step in the horizontal direction (i.e. in the direction of carriage motion). FIG. 3 illustrates another embodiment of the print head control sub-system 13 of FIG. 2 which can controllably increase the print density per carriage stepper motor step. This is accomplished by inserting a programmable divider/counter 45 between the programmable interval counter 18 and the step motor drive circuit 22. By applying motion control pulses 20 (shown in FIG. 4 at A) as data request pulses DR to the programmable divider/counter 45, the number of motor steps 20', shown in FIG. 4 at B which are actually input to the step motor drive circuit 22 may be reduced. The motor step pulses 20' may be made to occur once for any desired number of data request pulses DR. FIG. 4 illustrates an example in which the divider/counter 45 has been programmed for the printing of three dot elements per carriage motor step.

Figure 5:
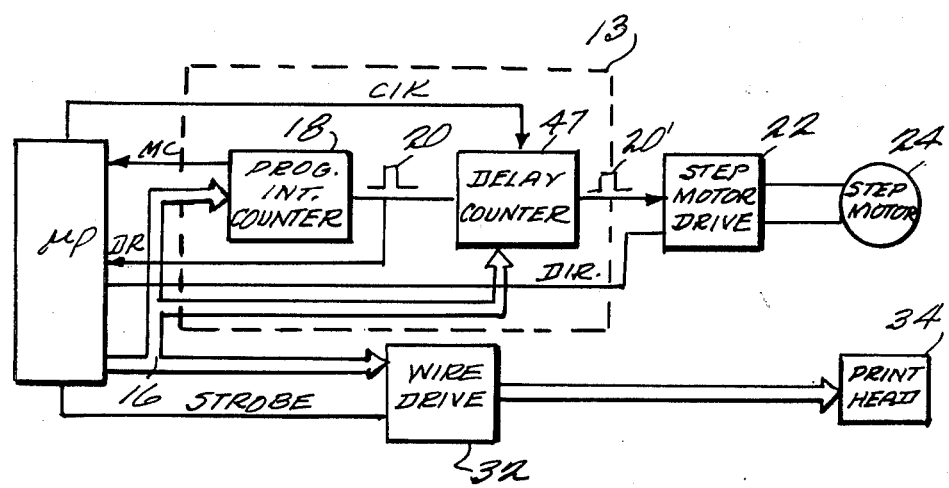
FIG. 5 illustrates another exemplary embodiment of the system of FIG. 2 including the feature of compensation for wire flight time delay.

With bi-directional printing in which interlace of print dot elements is used for greater vertical dot density, it is necessary to place dots that are printed from opposite directions in precise registration. At high speeds print wire flight time delay becomes an impediment to good registration. In prior art designs circuitry has been provided to make the print action command lead the motion increment command by a time chosen to compensate for the distance travelled by the carriage during the wire flight time. This approach results in a lead time setting which is only suitable for one carriage velocity. Thus, for each different carriage velocity a different lead time setting is necessary. In practice, it has been necessary to provide several lead time settings. In FIG. 5 another embodiment of the print head control sub-system of FIG. 2 is illustrated which provides flight time delay compensation which is independent of carriage velocity and is readily programmable by the microprocessor 12 (e.g. for different print heads having different characteristic delay times). This is accomplished by inserting a real-time delay counter 47 (driven by real time system CLK) between the programmable interval counter 18 and the stepper motor drive circuit 22.

In operation the circuit of FIG. 5 delays the motion control pulse 20 to compensate for the wire flight time. Since the wire flight time is typically constant for a given print head 34, the microprocessor 12 can initially program the delay counter 47 to compensate for the wire flight time. Since the wire flight time is independent of carriage velocity, the circuit shown in FIG. 5 represents a considerable advantage over the prior art systems which required a plurality of lead time settings. In the event print head 34 is changed (resulting in a change in the wire flight time), the new time-of-flight delay data can be easily re-programmed via the microprocessor 12.

Figure 6:
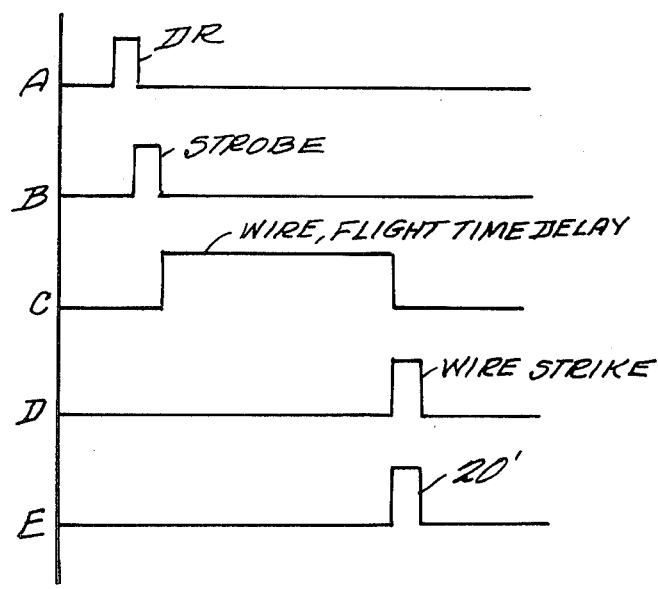
FIG. 6 illustrates signal timing diagrams for the print head control system of FIG. 5.

FIG. 6 illustrates signal timing diagrams illustrating the operation of the circuit shown in FIG. 5. FIG. 6 at A represents the input of a data request pulse DR to the microprocessor 12 which data request pulse is also input to the delay counter 47. A strobe pulse, shown in FIG. 6 at B is input to the wire drive 32 while the delay counter 47 delays the transmission of the motion control pulse 20 for a time period equal to the flight time delay. The motion control pulse 20' is ultimately input to the step motor drive 22 so as to coordinate the action of the carriage step motor 24 with the actual wire strike illustrated at D. As mentioned above, the flight time delay shown at C is typically constant for a given print head. Thus, each motion control pulse 20 is delayed by the same flight time delay such that compensation for wire flight time is achieved independently of the velocity of the carriage.

Figure 7:
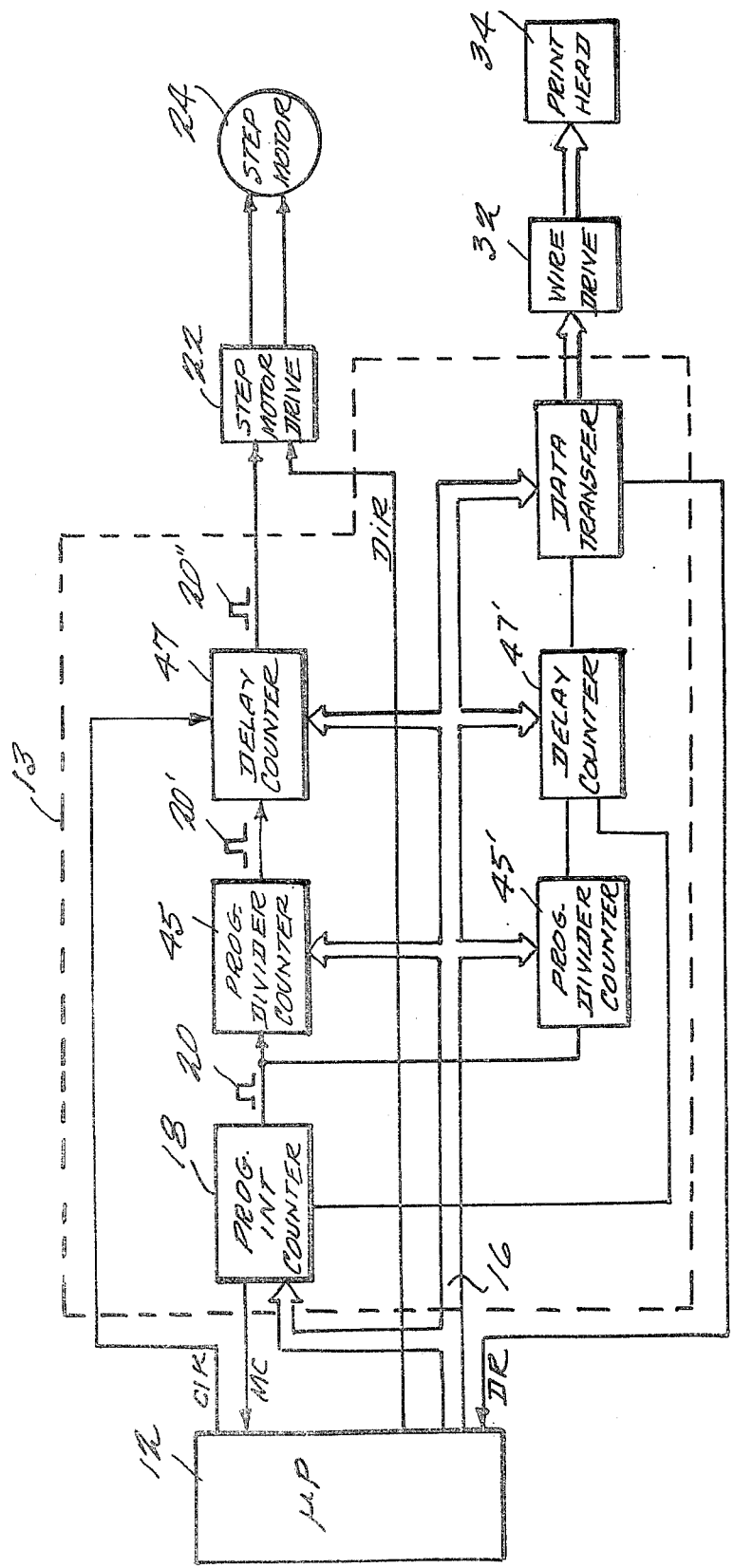
FIG. 7 illustrates another exemplary embodiment of the print head control system of FIG. 2 including the features of (a) compensating for wire flight time delay, (b) increasing dot print density per carriage motor step, and (c) compensating for motor shaft lag/lead.

In an actual dot matrix printer it may be desirable not only to increase the print density per carriage motor step and compensate for the wire flight delay time, but also to compensate for motor shaft lag/lead of the carriage step motor and/or other mechanical components of the carriage drive train. In FIG. 7, a further embodiment of the print head control sub-system of FIG. 2 is illustrated which includes the features of wire flight delay time compensation, increased print density per carriage motor step and motor shaft lag/lead compensation. The motion control pulse 20 produced by the interval counter 20 is input to the step motor drive circuit 22 through the programmable divider/counter 45 and the delay counter 47. The programmable divider/counter 45 increases the print density per motor step as discussed in conjunction with FIG. 3 while the delay counter 47 compensates for wire flight delay time as discussed in conjunction with FIG. 5. The programmable divider/counter 45' is provided to permit the ratio of dots to carriage motor steps to be other than a whole number. For example, if the desired ratio of dots to motor steps is five to three, dots-per-step data (five) is loaded into programmable divider/counter 45 while steps-per-dot data (three) is loaded into programmable divider/counter 45' so as to result in the desired integer ratio 5/3. The control scheme illustrated in FIG. 7 provides greater flexibility since any interger ratio of printed dots per motor step may be realized.

The delay counter 47' compensates for motor shaft lag/lead. This deviation is essentially an angular position error which may be either leading or lagging depending upon the load. It may vary from a maximum lag of approximately one step angle during acceleration to a maximum lead of the same amount during deceleration. By loading the appropriate shaft delay data into the delay counter 47', this lag or lead can be compensated.

It should be noted that flight time delay counter 47 is clocked by the system clock CLK so that its delay is in real time. The delay counter 47', however, is preferably clocked by an output of the programmable interval counter 18 which has a frequency proportional to the intended motor velocity. For example, it may be a series of pulses which occur at a multiple of the control pulse rate. In a practical arrangement the ratio might be sixteen to one. By this scheme the particular motor lag/- lead data byte may be chosen to have a mean value of eight to compensate for lag during constant speed and with increases/decreases therefrom that correctly compensate for the motor lag/lead expected at all speeds during acceleration/deceleration. Since one lag/lead value is expected for constant acceleration/deceleration and a second lag value is expected for constant velocity, the relative delay values once established may be easily selected and supplied by microprocessor 12.

As an example of a typical printer application, assume that data bytes from the microprocessor set the divider/counter 45 to three dots per motor step and set the delay counter 47 to compensate for a flight time delay of 250 microseconds. This will cause one motion control pulse 20' to be transmitted from the programmable divider/counter 45 for every three motion control pulses 20. The delay counter which is started from this step pulse will time out in 250 microseconds to provide a delayed motion control pulse 20" to the step motor drive circuit 22. In this particular example assume further that divider/counter 45' is set for division by one while the delay counter 47' is set to compensate for a motor lag of ¼ step. With this arrangement, each control pulse will produce a data request pulse which starts delay counter 47'. When the delay counter 47' completes its assigned count, an actual data transfer is effected to apply print data to the wire drive 32.

The system illustrated in FIG. 7 provides for great flexibility and accuracy in the relationship of dot elements and step pulses since the programmable divider/counters 45, 45' and delay counters 47 and 47' may be set to a wide variety of settings. For example, as mentioned above, if the relationship of three motor steps to five dot elements is desired, the dots-per-step data would have a value of five and would be loaded into the programmable divider/counter 45 while the steps-per-dot data would have a value of three and would be loaded into the programmable divider/counter 45'. Independently, the delay counter 47 may be initially set to compensate for the appropriate constant wire flight delay time delay for the print head in use (i.e. independently of carriage velocity) and the delay counter 47' may be set from time-to-time as appropriate to compensate for motor shaft lag/lead for the expected motor load during acceleration, constant speed and deceleration which motions are also typically controlled by the microprocessor.

It should be apparent from the above descriptions that a dot matrix printer may be designed with many combinations and/or subcombinations of the above described features. For example, it may be desirable to compensate for wire flight time and motor shaft lag without increasing the density of the dots per motor step, etc. Thus, it is anticpated that various modifications and variations of the exemplary embodiments may be realized which nevertheless retain some or all of the novel advantages and features of these embodiments. All such modifications and variations are intended to be included within the scope of the appended claims.

What is claimed is:

1. A dot matrix printer control circuit for coordinated control of the motion of a print head carriage and of the printing action of a dot matrix print head carried thereby, said control circuit comprising:

control means for periodically generating a motion control signal corresponding to a predetermined increment of carriage motion;

carriage drive means including a step motor connected to receive said motion control signal and to move said carriage by said predetermined increment in response thereto; and print head drive means for activating the dot matrix print head to effect printing action in accordance with print data received in response to an occurrence of said motion control signal;

said carriage drive means including flight-time delay means for producing step motor drive pulses in delayed response to said motion control signals, the time duration of delay being predetermined to compenstate for the time required by said print head to effect a printing action after activation thereof in response to said motion control signal.

2. A dot matrix printer control circuit as in claim 1 wherein said flight time delay means includes a programmable clock-driven counter.

3. A dot matrix printer control circuit as in claim 1 or 2 wherein said carriage drive means includes divider/counter means for producing a step motor drive pulse only in response to the occurrence of a predetermined number of said motion control signals.

4. A dot matrix printer control circuit as in claim 3 wherein said divider/counter means comprises a programmable pulse rate divider.

5. A dot matrix printer control circuit as in claim 1 or 2 further including shaft lag/lead motor delay means for delaying the request for print data generated in response to said motion control signal to compensate for motor lag/lead.

6. A dot matrix printer control circuit as in claim 3 further including shaft lag/lead delay means for delaying the request for print data generated in response to said motion control signal to compensate for motor lag/lead.

7. A dot matrix printer control circuit as in claim 5 further including divider/counter means for producing a step motor drive pulse only in response to the occurrence of a predetermined number of said motion control signals.

8. A dot matrix printer control circuit as in claim 1 or 2 further comprising;

a divider/counter means for causing a request for print data to be generated only in response to the occurrence of a predetermined number of said motion control signals.

9. A dot matrix printer control circuit as in claim 3 further comprising:

a second divider/counter means for causing a request for print data to be generated only in response to the occurrence of a predetermined number of said motion control signals.

10. A dot matrix printer control circuit as in claim 4 further comprising:

a divider/counter means for causing a request for print data to be generated only in response to the occurrence of a predetermined number of said motion control signals.

11. A dot matrix printer control circuit as in claim 7 further comprising:

a second divider/counter means for causing a request for print data to be generated only in response to the occurrence of a predetermined number of said motion control signals.

12. A dot matrix printer comprising the control circuit of claim 1 or 2 and including a print head carriage, a dot matrix printer head carried thereby, step motor means for moving said carriage paper advance means and second step motor means for advancing a paper substrate transverse to the direction of carriage motion.

13. In a digital data printer, an open-loop control system for coordinating the movement of a print head carriage and the printing action of the carried print head, said control system comprising:
  a data source for providing desired carriage motion data and for also providing print data in response to data request signals;
  circuit means for producing motion control pulses to control the movement of said carriage in response to said carriage motion data, said control pulses also being used to generate said data request signals;
  means for driving the carriage in response to said motion control pulses including a delay means for delaying the control pulses input to said carriage driving means input to said carriage driving means for a predetermined time interval representing the expected flight time delay of the print head; and
  means for receiving said print data produced in response to said data request signal and for controlling the printing action of said print head in response to said print data.

14. The system of claim 13 wherein the data source provides additional data representative of a predetermined desired relationship between the motion data and print data and including means for modifying said motion control pulses actually input to said carriage driving means in accordance with said additional data.

15. The printer of claim 14 wherein said additional data specifies the number of desired printing operations per control pulse and the means for modifying includes a programmable divider/counter for reducing the number of control pulses input to said carriage driving means.

16. The printer of claim 13 or 14 including means for modifying the generation of the data request signal.

17. The printer of claim 16 wherein the additional data represents the expected lag/lead time of the means for driving the carriage and the means for modifying includes a delay counter for delaying the generation of the data request signals input to the data source.

18. The system of claim 16 wherein the additional data represents the number of control pulses per printing operation and the means for modifying includes a programmable divider counter for reducing the number of data request signals actually generated by such number.

19. An open-loop system for coordinating the movement of a print head carriage and a dot matrix print head carried thereby, said system comprising:
  a data source for providing carriage motion data, dot matrix print data, dot elements per motor step data and motor steps per dot element data in response to a data request signal;
  circuit means for producing motion control pulses for controlling the movement of said carriage in response to said carriage motion data, said motion control pulses also being used to generate said data request signal;
  a step motor for driving said carriage in response to said motion control pulses;
  means for driving the dot matrix printing elements of said print head;
  means for receiving said print data and for inputting said print data to said means for driving said print head;
  a first programmable divider/counter for reducing the number of motor drive pulses generated to drive said stepper motor in accordance with said dot elements per motor step data; and
  a second programmable divider/counter for reducing the number of data request signals generated by said control pulses in accordance with said motor steps per dot elements data.

20. An open-loop system for coordinating the movement of a print head carriage and a dot matrix print head carried thereby, said system comprising:
  a data source for providing carriage motion data, print data and flight time data in response to a data request signal;
  circuit means for producing motion control pulses for controlling the movement of said carriage in response to said carriage motion data, said motion control pulses also being used to generate said data request signal;
  a step motor for driving the carriage in response to said control pulses;
  wire drive means for receiving said print data and for selectively driving print head wires in response to said print data; and
  delay means for delaying the input of said motion control pulses to said step motor in response to said flight time data.

21. An open-loop system for coordinating the movement of a print head carriage and a dot matrix print head carried thereby, said system comprising:
  a data source for providing carriage motion data, print data and motor lag/lead data in response to a data request signal;
  circuit means for producing motion control pulses for controlling the movement of said carriage in response to said carriage motion data, said motion control pulses also being used to generate said data request signal;
  a step motor for driving the carriage in response to said motion control pulses;
  wire drive means for receiving said print data and for selectively driving print head wires in response to said print data; and
  delay means for delaying the input of said motion control pulses to said data source in response to said motor lag/lead data.

22. A method of coordinating the motion of a print head carriage and the printing action of a dot matrix print head carried thereby, said method comprising:
  periodically generating motion control pulses each representing an increment of desired print head carriage
  moving said carriage in response to said control pulses after a predetermined time delay corresponding to the time required for the print head to effect a printing operation; and
  printing a respective column of dots in accordance with print data received by said print head in response to the occurrence of each motion control pulse.

23. The method of claim 22 including the step of delaying the printing of said print head to compensate for lag/lead in the movement of said carriage.

24. The method of claim 22 or 23 wherein the step of moving said carriage occurs only upon the occurence of a first predetermined number of said motion control pulses and the step of printing occurs only upon the occurrence of a second predetermined number of said motion control pulses.

* * * * *